(12) United States Patent
Kashima et al.

(10) Patent No.: US 10,730,793 B2
(45) Date of Patent: Aug. 4, 2020

(54) CHEMICALLY STRENGTHENED GLASS AND PRODUCTION METHOD FOR SAME

(71) Applicant: AGC Inc., Chiyoda-ku (JP)

(72) Inventors: Izuru Kashima, Tokyo (JP); Yusuke Fujiwara, Tokyo (JP); Naoki Uemura, Tokyo (JP); Kiyoshi Tamai, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 544 days.

(21) Appl. No.: 15/651,316

(22) Filed: Jul. 17, 2017

(65) Prior Publication Data

US 2017/0313620 A1    Nov. 2, 2017

Related U.S. Application Data

(63) Continuation of application No. PCT/JP2016/051167, filed on Jan. 15, 2016.

(30) Foreign Application Priority Data

Jan. 20, 2015   (JP) .................................. 2015-008848

(51) Int. Cl.
*C03C 21/00* (2006.01)
*C03C 15/00* (2006.01)
(Continued)

(52) U.S. Cl.
CPC ............ *C03C 21/002* (2013.01); *C03C 3/087* (2013.01); *C03C 15/00* (2013.01); *C03C 23/0075* (2013.01); *C03C 2218/34* (2013.01)

(58) Field of Classification Search
None
See application file for complete search history.

(56) References Cited

U.S. PATENT DOCUMENTS

| | | | |
|---|---|---|---|
| 6,911,261 B2 * | 6/2005 | Jensen | .................... C03C 15/02 216/31 |
| 2013/0061636 A1 * | 3/2013 | Imai | ..................... C03C 21/002 65/30.14 |

(Continued)

FOREIGN PATENT DOCUMENTS

| | | |
|---|---|---|
| JP | 2005-174500 A | 6/2005 |
| JP | 2006-324006 | 11/2006 |

(Continued)

OTHER PUBLICATIONS

International Search Report dated Mar. 29, 2016 in PCT/JP2016/051167 filed Jan. 15, 2016 (with English translation).

(Continued)

*Primary Examiner* — David Sample
(74) *Attorney, Agent, or Firm* — Oblon, McClelland, Maier & Neustadt, L.L.P.

(57) ABSTRACT

An object of the present invention is to provide a chemically strengthened glass having enhanced surface strength and bending strength. The present invention relates to a chemically strengthened glass having a compressive stress layer formed on a surface layer thereof by an ion exchange method, in which a straight line obtained by a linear approximation of a hydrogen concentration Y in a region of a depth X from an outermost surface of the glass satisfies a specific relational equation (I) in X=0.1 to 0.4 (μm), and an edge surface connecting main surfaces on a front side and a back side of the glass has a skewness (Rsk) measured based on JIS B0601 (2001) being −1.3 or more.

3 Claims, 5 Drawing Sheets

(51) Int. Cl.
*C03C 3/087* (2006.01)
*C03C 23/00* (2006.01)

(56) References Cited

U.S. PATENT DOCUMENTS

| | | | |
|---|---|---|---|
| 2016/0130178 A1* | 5/2016 | Kashima | C03C 21/006 428/141 |
| 2016/0130179 A1* | 5/2016 | Kashima | C03C 21/006 428/141 |
| 2016/0207828 A1* | 7/2016 | Kashima | C03C 3/091 |

FOREIGN PATENT DOCUMENTS

| | | |
|---|---|---|
| JP | 2009-87408 | 4/2009 |
| JP | 2009-93744 | 4/2009 |
| JP | 2012-229154 | 11/2012 |
| JP | 2014-201445 | 10/2014 |
| WO | WO-2013137329 A1 * 9/2013 | C03C 15/02 |
| WO | WO-2015008763 A1 * 1/2015 | C03C 3/085 |
| WO | WO-2015008764 A1 * 1/2015 | C03C 3/085 |
| WO | WO-2015008766 A1 * 1/2015 | C03C 3/085 |

OTHER PUBLICATIONS

Written Opinion dated Mar. 29, 2016 in PCT/JP2016/051167 filed Jan. 15, 2016.
S. Ito, et al. "Crack Blunting of High-Silica Glass", Journal of the American Ceramic Society, vol. 65, No. 8, 1982, 2 pages.
Won-Taek Han, et al. "Effect of residual water in silica glass on static fatigue", Journal of Non-Crystalline Solids, vol. 127, 1991, 8 pages.
Stamenko Iiievski, et al. "Practical IR extinction coefficients for water in commercial glasses determined by nuclear reaction analysis", Glastech. Ber. Glass Sci. Technol., vol. 73, No. 2, 2000, 7 pages.

* cited by examiner

CHEMICALLY STRENGTHENED GLASS AND PRODUCTION METHOD FOR SAME

TECHNICAL FIELD

The present invention relates to a chemically strengthened glass and a production method of the same.

BACKGROUND ART

To enhance the protection and beauty of a display in flat display panel devices such as digital cameras, mobile phones or personal digital assistants (PDAs), a thin plate-shaped cover glass is arranged on the front surface of a display such that a region of the cover glass is wider than an image display part. Glass has high theoretical strength, but the strength is greatly decreased by scratches made thereon. For this reason, a chemically strengthened glass having a compressive stress layer formed on the glass surface by ion exchange or the like is used as a cover glass requiring strength.

With demands of reduction in weight and reduction in thickness to a flat panel display device, a cover glass itself is required to decrease its thickness. Therefore, for the cover glass, further strength is required in main surfaces (front and back surfaces) and an edge surface in order to satisfy the object thereof.

As strength of a glass, for example, surface strength is regarded as an index of strength of glass main surfaces, and for example, bending strength is regarded as an index of strength of glass edge surface.

Regarding surface strength of a glass, it is known that the surface strength of a glass is decreased by the presence of hydrogen (water) in a glass (Non-Patent Documents 1 and 2).

PRIOR ART DOCUMENTS

Non-Patent Documents

Non-Patent Document 1: S. ITO et. al., "Crack Blunting of High-Silica Glass", Journal of the American Ceramic Society, Vol. 65, No. 8, (1982), 368-371

Non-Patent Document 2: Won-Taek Han et. al., "Effect of residual water in silica glass on static fatigue", Journal of Non-Crystalline Solids, 127, (1991) 97-104

SUMMARY OF THE INVENTION

Problems that the Invention is to Solve

The present inventors have found that surface strength of a glass is sometimes decreased after chemical strengthening, and the main cause thereof is that water in the atmosphere enters a glass surface layer and thereby chemical defects are formed. They have further found that this phenomenon occurs by not only chemical strengthening, but passing through a temperature rising step in a production process of a glass.

It is considered as a method of removing water in a glass surface layer to scrape off a water-containing layer by a method such as polishing a glass main surface after chemical strengthening. However, a glass surface is damaged by polishing and there is a possibility that strength is rather deteriorated.

An object of the present invention is to provide a chemically strengthened glass having excellent surface strength and bending strength, in which strength of a glass is effectively suppressed from being deteriorated even though performing chemical strengthening.

Means for Solving the Problems

The present inventors have found that surface strength and bending strength of a glass are remarkably enhanced by setting a hydrogen concentration profile in a surface layer of a chemically strengthened glass to a specific range and setting skewness (Rsk) of an edge surface to a specific range, and have completed the present invention.

The present invention is as below.

<1>

A chemically strengthened glass having a compressive stress layer formed on a surface layer thereof by an ion exchange method, in which:

a straight line obtained by a linear approximation of a hydrogen concentration Y in a region of a depth X from an outermost surface of the glass satisfies the following relational equation (I) in X=0.1 to 0.4 (μm); and an edge surface connecting main surfaces on a front side and a back side of the glass has a skewness (Rsk) measured by using a non-contact profilometer based on JIS B0601 (2001) being −1.3 or more:

$$Y = aX + b \qquad (I)$$

[in the equation (1), meanings of each symbol are as follows:

Y: hydrogen concentration (in terms of $H_2O$, mol/L);

X: depth from outermost surface of glass (μm);

a: −0.255 to −0.005; and b: 0.020 to 0.215].

<2>

The chemically strengthened glass according to <1> above, in which the edge surface connecting the main surfaces on the front side and the back side of the glass has a concave part formed by an etching treatment.

<3>

The chemically strengthened glass according to <1> or <2> above, in which the glass is an aluminosilicate glass, a soda lime glass or an aluminoborosilicate glass.

<4>

A production method of a chemically strengthened glass, including a step of bringing a glass into contact with an inorganic salt containing potassium nitrate, to ion-exchange Na in the glass with K in the inorganic salt, in which the inorganic salt further contains at least one kind of salt selected from the group consisting of $K_2CO_3$, $Na_2CO_3$, $KHCO_3$, $NaHCO_3$, $K_3PO_4$, $Na_3PO_4$, $K_2SO_4$, $Na_2SO_4$, KOH, and NaOH, and the method further includes:

a step of etching an edge surface connecting main surfaces on a front side and a back side of the glass before the ion exchange;

a step of cleaning the glass after the ion exchange;

a step of acid-treating the glass after the cleaning; and a step of alkali-treating the glass after the acid-treating.

<5>

The production method according to <4> above, in which, by the etching step, a skewness (Rsk) measured by using a non-contact profilometer based on JIS B0601 (2001) of the edge surface is controlled to −1.3 or more.

<6>
A chemically strengthened glass, obtained by the production method described in <4> or <5> above.

ADVANTAGEOUS EFFECTS OF THE INVENTION

According to the chemically strengthened glass of the present invention, both surface strength and bending strength of a glass can be greatly enhanced by setting a hydrogen concentration profile in a glass surface layer to a specific range and setting skewness (Rsk) of an edge surface to a specific range.

Furthermore, according to the production method of a chemically strengthened glass of the present invention, a chemically strengthened glass having enhanced surface strength and bending strength can be obtained. Regarding an acid treatment and an alkali treatment, the treatments can be proceeded with by dipping in a solution. Therefore, it is efficient in that it is easy to handle various glass shapes and glasses having large area and that both surfaces of a glass can be simultaneously treated.

Figure 2:
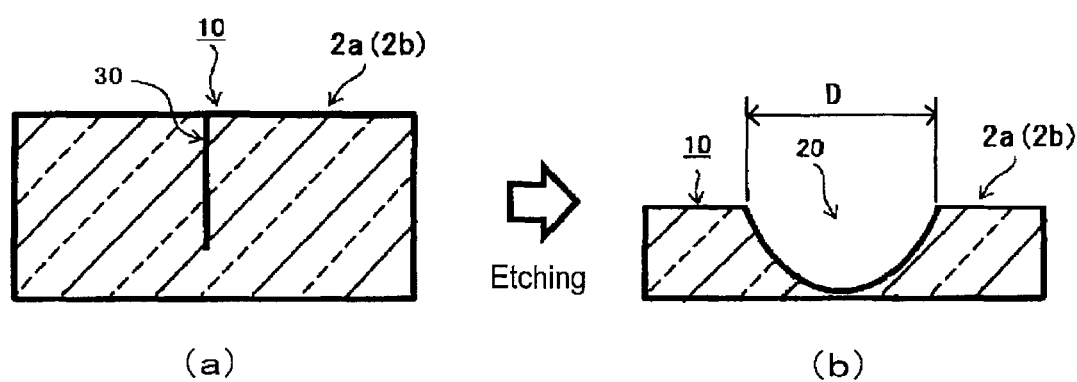

(a) of FIG. 2 and (b) of FIG. 2 are explanatory views illustrating the state of etching of a glass edge surface.

Figure 3:
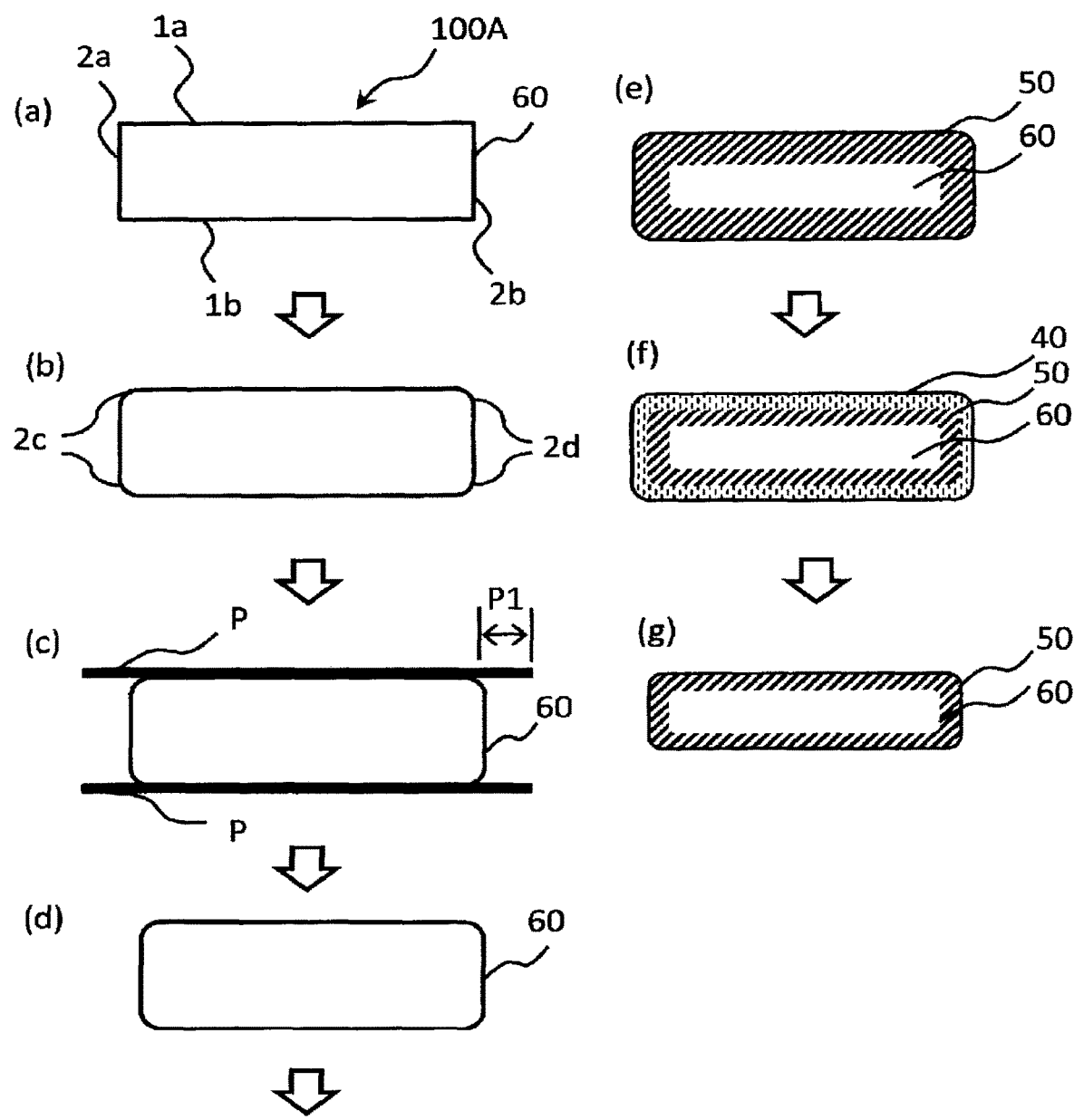

(a) of FIG. 3 to (g) of FIG. 3 are schematic views illustrating a production process of a chemically strengthened glass of the present invention.

Figure 4:
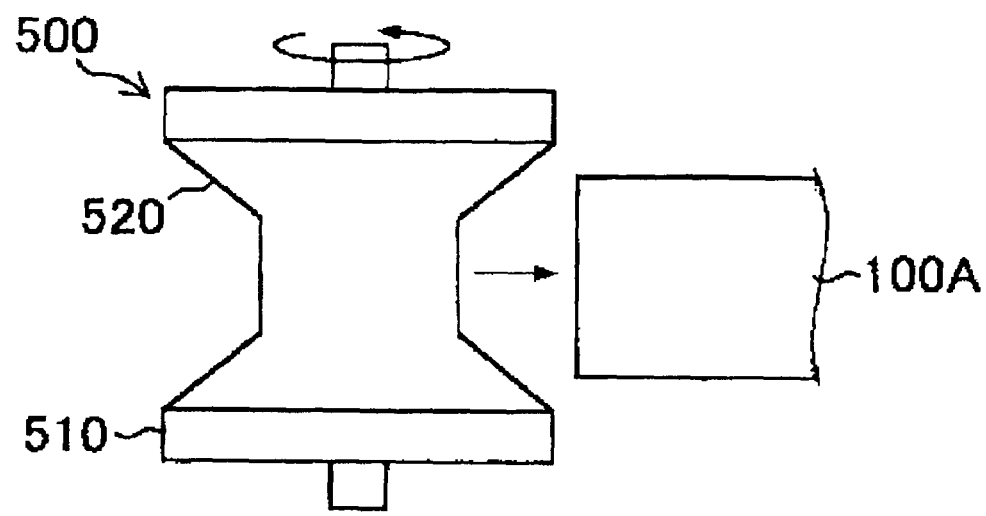

FIG. 4 is a schematic view for explaining a chamfering method.

Figure 5:
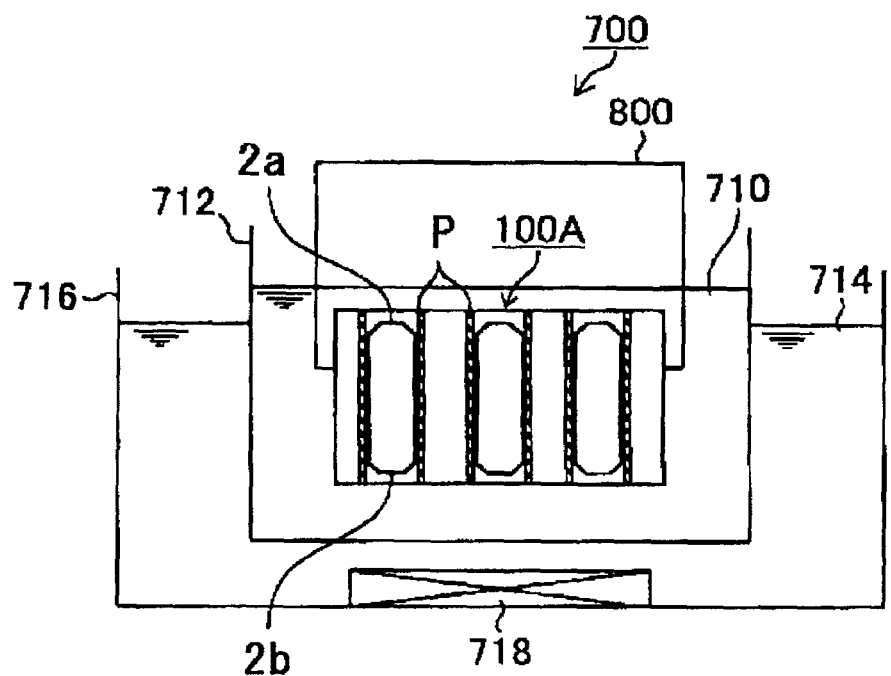

FIG. 5 is a view illustrating an etching apparatus.

Figure 6:
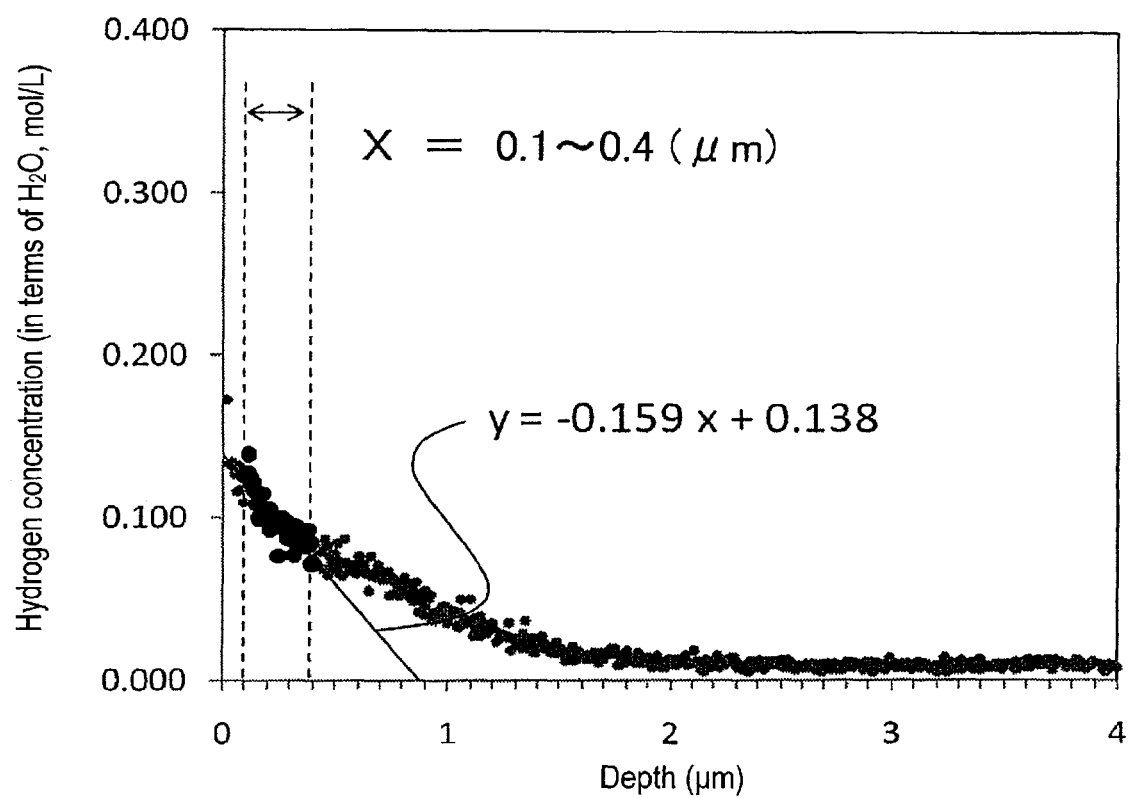

FIG. 6 is an explanatory view for deriving the relational equation (I) from a graph having plotted thereon hydrogen concentration profiles in a surface layer of the chemically strengthened glass obtained in Example 1.

Figure 7:
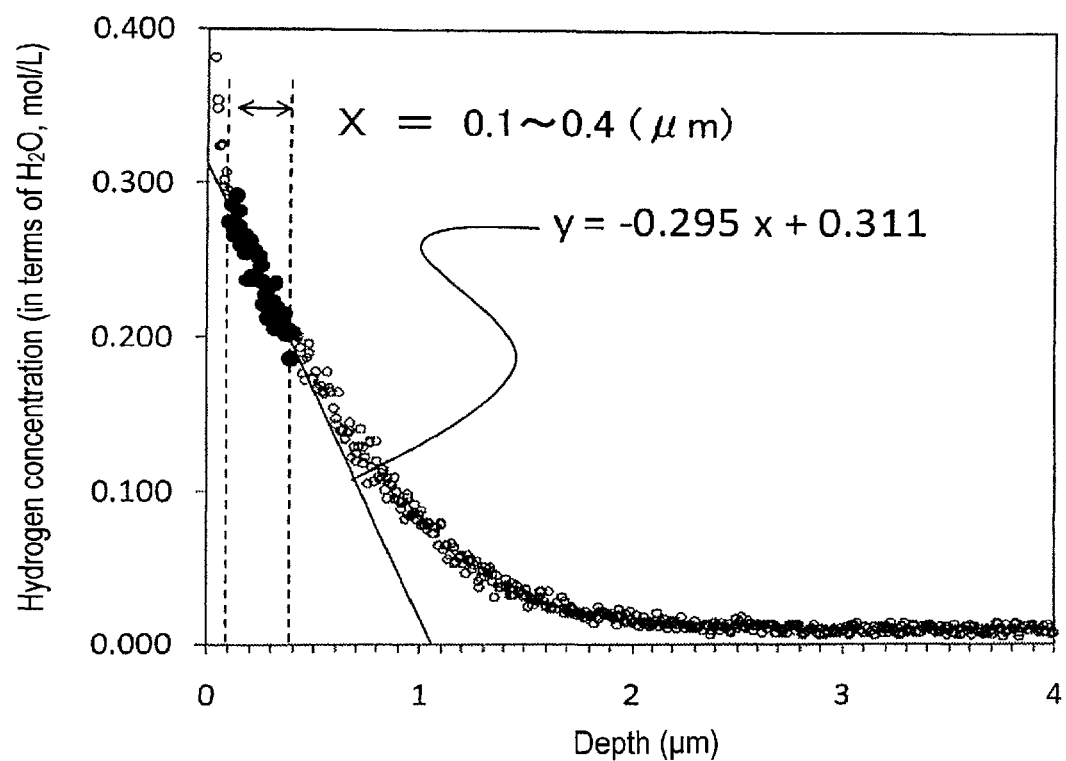

FIG. 7 is an explanatory view for deriving the relational equation (I) from a graph having plotted thereon hydrogen concentration profiles in a surface layer of the chemically strengthened glass obtained in Comparative Example 2.

MODE FOR CARRYING OUT THE INVENTION

The present invention is described in detail below, but the present invention is not limited to the following embodiments and can be carried out by optionally modifying within the scope that does not depart the gist of the present invention. In the present description, "wt %" is synonymous with "mass %" and "wt ppm" is synonymous with "mass ppm".

<Chemically Strengthened Glass>

The chemically strengthened glass of the present invention is a chemically strengthened glass having a compressive stress layer formed on a surface layer thereof by an ion exchange method, and is characterized in that a hydrogen concentration in a region having a certain depth from the outermost surface of a glass satisfies the relational equation (I) described hereinafter and skewness (Rsk) of a glass edge surface is −1.3 or more.

The compressive stress layer is a high density layer formed on a surface layer of a glass by that the glass is brought into contact with an inorganic salt such as potassium nitrate to ion-exchange Na ions on the glass surface with K ions in the inorganic salt.

In the chemically strengthened glass of the present invention, a hydrogen concentration profile in a glass surface layer is within a specific range. Specifically, a straight line obtained by a linear approximation of a hydrogen concentration Y in a region of a depth X from the outermost surface of a glass satisfies the following relational equation (I) in X=0.1 to 0.4 (μm).

$$Y = aX + b \quad (I)$$

[In the equation (I), the meanings of each symbol are as follows:
Y: hydrogen concentration (in terms of $H_2O$, mol/L);
X: depth from outermost surface of glass (μm);
a: −0.255 to −0.005; and
b: 0.020 to 0.215]

Regarding strength of a glass, it is known that strength of a glass is decreased by the presence of hydrogen (water) in a glass. The present inventors have found that strength is sometimes decreased after chemical strengthening treatment, and the main cause thereof is that water in the atmosphere enters a glass and thereby chemical defects are formed. It has been further found that this phenomenon occurs by not only chemical strengthening, but passing through a temperature rising step in a production process of a glass.

When a hydrogen concentration in a glass is high, hydrogen enters connection network of Si—O—Si of a glass in the form of Si—OH and the connection of Si—O—Si is broken. It is considered that when a hydrogen concentration in a glass is high, the portion in which the connection of Si—O—Si is broken increases, chemical defects are easy to be formed, and strength is thereby decreased.

The relational equation (I) holds in a region of a depth X=0.1 to 0.4 μm from the outermost surface. The depth of a compressive stress layer formed by ion exchange depends on the degree of chemical strengthening, but it is formed in a range of 5 to 50 μm. The depth of hydrogen entering a glass depends on a diffusion coefficient, a temperature and time, and the entering amount of hydrogen is influenced by the amount of water in the atmosphere in addition to those factors. The hydrogen concentration after chemical strengthening is highest in the outermost surface, and is gradually decreased toward a deep portion (bulk) in which a compressive stress layer is not formed. The relational equation (I) defines the degree of decrease, but there is a possibility that the water concentration varies by change in quality with time at the outermost surface (X=0 μm). Therefore, it was determined that the equation holds in a region of near surface (X=0.1 to 0.4 μm) which is considered to be free of the influence.

In the equation (I), a is a gradient defining the degree of decrease of the hydrogen concentration. The range of a is −0.255 to −0.005, preferably −0.255 to −0.010, and more preferably −0.255 to −0.020.

In the equation (I), b corresponds to the hydrogen concentration at the outermost surface (X=0 μm). The range of b is 0.020 to 0.215, preferably 0.030 to 0.215, and more preferably 0.040 to 0.215.

It is generally considered that the decrease of strength of a glass is due to that microcracks present on the glass surface extend by mechanical pressure from the outside. According to Non-Patent Document 2, it is considered that cracks are easy to extend as glass structure at a tip of cracks is in Si—OH rich state. Assuming that the tip of cracks is exposed in the atmosphere, it is estimated that Si—OH amount at the tip of cracks show a positive correlation with the hydrogen concentration on the outermost surface of a glass. Therefore, it is preferred that b corresponding the hydrogen concentration on the outermost surface is within low range in the degree shown above.

As shown in FIG. 6 and FIG. 7, regarding the glass having passed through the chemically strengthening step, remarkable difference was not recognized in the entering depth of hydrogen. There is high possibility that the entering depth of hydrogen changes depending on the conditions of the chemically strengthening step, but assuming that it does not change, negative correlation is observed in b corresponding to the hydrogen concentration on the outermost surface and a corresponding to a gradient defining the degree of decrease of the hydrogen concentration. Therefore, a is preferably high range in the degree shown above.

Thus, it has been found in the present invention, that not only the hydrogen concentration itself in the surface layer is defined, but a hydrogen concentration profile is focused on, and it has been found that strength of a chemically strengthened glass can be greatly enhanced by setting the hydrogen concentration in the surface layer and its degree of decrease to specific ranges.

[Measurement Method of Hydrogen Concentration Profile]

The hydrogen concentration profile ($H_2O$ concentration, mol/L) of a glass used herein is a profile measured under the following analytical conditions.

Secondary Ion Mass Spectrometry (SIMS) was used for the measurement of the hydrogen concentration profile of a glass. Standard sample having the known hydrogen concentration is required in the case of obtaining quantitative hydrogen concentration profile with SIMS.

Preparation method of a standard sample and a quantitative method of a hydrogen concentration are described below.

1) A part of a glass to be measured is cut out.

2) A region of 50 μm or more from the surface of the cut glass is removed by polishing or chemical etching. The removal treatment is performed on both surfaces. That is, the removal thickness in both surfaces is 100 μm or more. The removal-treated glass is used as a standard sample.

3) The standard sample is subjected to Infrared Spectroscopy (IR) to obtain absorbance height $A_{3550}$ of a peak top in the vicinity of 3550 cm$^{-1}$ of IR spectrum and absorbance height $A_{4000}$ (base line) at 4000 cm$^{-1}$ of IR spectrum.

4) Sheet thickness d (cm) of the standard sample is measured by using a sheet thickness measuring instrument such as a micrometer.

5) Infrared practical absorbance coefficient $\varepsilon_{pract}$ (L/(mol·cm)) of $H_2O$ in a glass is set to 75 by reference to Literature A, and the hydrogen concentration (in terms of $H_2O$, mol/L) of the standard sample is obtained by using the equation (II).

$$\text{Hydrogen concentration of standard sample} = (A_{3550} - A_{4000})/(\varepsilon_{pract} \cdot d) \quad \text{(II)}$$

Literature A: S. Ilievski et al., Glastech. Ber. Glass Sci. Technol., 73 (2000) 39.

The glass to be measured and the standard sample having the known hydrogen concentration obtained by the above method are simultaneously carried into SIMS apparatus, and measurements are performed in order, thereby obtaining profiles in a depth direction of strength of $^1H^-$ and $^{30}Si^-$. Thereafter, $^1H^-$ profile is divided by $^{30}Si^-$ profile to obtain a profile in a depth direction of $^1H^-/^{30}Si^-$ strength ratio. From the profile in a depth direction of $^1H^-/^{30}Si^-$ strength ratio of the standard sample, average $^1H^-/^{30}Si^-$ strength ratio in a region of a depth of from 1 μm to 2 μm is calculated and a calibration curve between this value and the hydrogen concentration is prepared so as to pass through the original point (calibration curve in a standard sample of level 1). The $^1H^-/^{30}Si^-$ strength ratio in a vertical axis of the profile of the glass to be measured is converted into a hydrogen concentration by using the calibration curve, thereby obtaining a hydrogen concentration profile of the glass to be measured. Measurement conditions of SIMS and IR are as follows.

[Measurement Conditions of SIMS]

Apparatus: ADEPT 1010, manufactured by ULVAC-PHI, Inc.

Primary ion species: $Cs^+$

Accelerated voltage of primary ion: 5 kV

Current value of primary ion: 500 nA

Incident angle of primary ion: 60° relative to normal line of sample face

Luster size of primary ion: 300×300 μm$^2$

Polarity of secondary ion: minus

Detection region of primary ion: 60×60 μm$^2$ (4% of luster size of primary ion)

ESA Input Lens: 0

Use of neutralization gun: used

Method of converting a horizontal axis into depth from sputtering time: Depth of analytical crater is measured with a stylus type surface shape measuring instrument (Dektak 150, manufactured by Veeco Instruments Inc.) to obtain a sputter rate of primary ions. By using the sputter rate, a horizontal axis is converted into a depth from sputtering time.

Field axis potential when detecting $^1H^-$: There is a possibility that an optimum value changes for every apparatus. The value is set while a measurer pays attention such that background is sufficiently cut.

[Measurement Conditions of IR]

Apparatus: Nic-plan/Nicolet 6700, manufactured by Thermo Fisher Scientific Co.

Resolving power: 4 cm$^{-1}$

Integration: 16

Detector: TGS detector

The relational equation (I) is derived from a hydrogen concentration profile ($H_2O$ concentration, mol/L) of a glass measured by the above analytical conditions by the following procedures. As shown in FIG. 6 and FIG. 7, linear approximation is performed to a hydrogen concentration profile in a region of a depth of 0.1 to 0.4 μm. The equation of approximation straight line obtained is used as the relational equation (I).

The means for controlling a and b includes alternation of flux concentration, sodium concentration, temperature, time and the like in a chemically strengthening step.

(Strength of Glass Surface)

The surface strength of the chemically strengthened glass of the present invention can be evaluated by a ball on ring test.

(Ball on Ring Test)

The chemically strengthened glass of the present invention is evaluated by BOR surface strength F (N) measured by a ball on ring (BOR) test in which a glass sheet is arranged on a ring made of a stainless steel having a diameter of 30 mm and a roundness such that a contact part has a curvature of radius of 2.5 mm and, in the state that a sphere made of a steel having a diameter of 10 mm has been brought into contact with the glass sheet, a load of the sphere is applied to the center of the ring under static load conditions.

The chemically strengthened glass of the present invention satisfies preferably F≥1500×t$^2$, and more preferably F≥2000't$^2$ [in the formulae, F is BOR surface strength (N) measured by the ball on ring test, and t is a sheet thickness (mm) of the glass]. When the BOR surface strength F (N) is within the range, an excellent surface strength can be exhibited even in the case where the thickness of the sheet is decreased.

Figure 1:
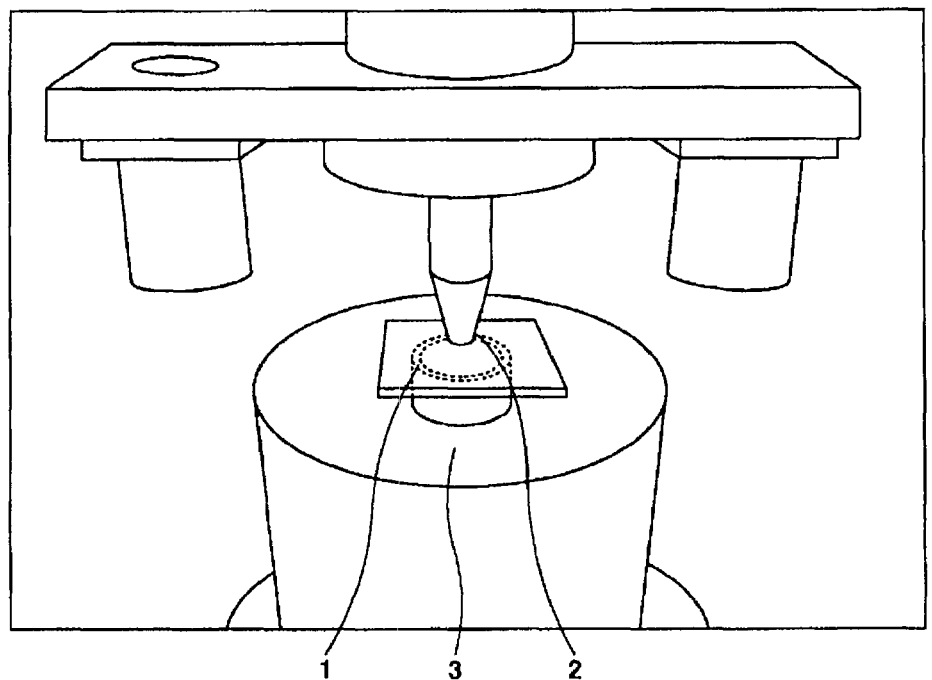
FIG. 1 is a schematic view for explaining a method of a ball on ring test.

A schematic view for explaining the ball on ring test used in the present invention is illustrated in FIG. 1. In the ball on ring (BOR) test, glass sheet 1 is pressurized by using a pressuring jig 2 made of SUS304 (hardened steel, diameter 10 mm, mirror finishing) in the state that the glass sheet 1 is placed horizontally, and surface strength of the glass sheet 1 is measured.

In FIG. 1, the glass sheet 1 as a sample is horizontally provided on a receiving jig 3 made of SUS304 (diameter: 30 mm, curvature R of contact part: 2.5 mm, contact part is hardened steel, mirror finishing). The pressuring jig 2 for pressuring the glass sheet 1 is provided above the glass sheet 1.

In the present embodiment, from the above of the glass sheet 1 obtained after the Examples and Comparative Examples, a central region of the glass sheet 1 is pressurized. The test conditions are as follows.

Thickness of sample: 0.56 (mm)
Lowering speed of pressurizing jig 2: 1.0 (mm/min)

In this case, fracture load (unit: N) when a glass was fractured is used as BOR surface strength, and an average value of the measurements of 20 times is used as BOR average surface strength. However, in the case where a fracture origin of a glass sheet is 2 mm or more apart from a ball pushing position, the case is eliminated from data for calculating an average value.

(Skewness (Rsk) of Edge Surface)

The chemically strengthened glass of the present invention has skewness (Rsk) of a glass edge surface of −1.3 or more, preferably −1.0 or more, and more preferably −0.7 or more. When the skewness of an edge surface is within the range, a glass having high bending strength can be obtained.

Skewness (Rsk) of a glass edge surface in the present invention is measured by using a non-contact surface shape measuring instrument based on JIS B0601 (2001). As the measuring instrument, for example, non-contact surface shape measuring instrument (PF-60) manufactured by Mitaka Kohki Co., Ltd. can be used.

(Glass Bending Strength (Edge Surface Strength))

As the bending strength in the present invention, four-point bending strength measured by the test method defined in JIS R1601 (2008) is used as an index. The chemically strengthened glass of the present invention has bending strength measured by that method of 300 MPa or more, preferably 500 MPa or more, and more preferably 900 MPa or more.

The chemically strengthened glass of the present invention further has the following physical properties.

Surface roughness of the main surface in a measurement range of 10 μm×5 μm measured by AFM surface observation is preferably 0.21 nm to 0.5 nm. The surface roughness of a conventional chemically strengthened glass sheet is 0.15 nm to 0.2 nm.

<Production Method of Chemically Strengthened Glass>

One embodiment of the method for producing the chemically strengthened glass according to the present invention is described below, but the present invention is not limited thereto.

(Composition of Glass)

The glass used in the present invention may contain sodium, and ones having various compositions can be used so long as those have a composition capable of molding and strengthening by a chemically strengthening treatment. Examples thereof specifically include aluminosilicate glass, soda lime glass, borosilicate glass, lead glass, alkali barium glass, and aluminoborosilicate glass. Of those, aluminosilicate glass, soda lime glass or aluminoborosilicate glass is preferred.

The production method of a glass is not particularly limited, and production can be performed by charging desired glass raw materials in a continuous melting furnace, heating and melting the glass raw materials at a temperature of preferably 1500 to 1600° C., performing fining, and then performing feeding into a forming apparatus, forming the molten glass into a plate shape, and performing annealing.

Various methods can be used in forming the glass. For example, forming methods such as a downdraw process (for example, overflow downdraw process, a slot down process and a redraw process), a float process, a rollout process, and a pressing process can be used.

The thickness of a glass is not particularly limited. To effectively perform a chemically strengthening treatment, it is preferably 5 mm or less, and more preferably 3 mm or less. Furthermore, the sheet thickness is still more preferably 1 mm or less, and particularly preferably 0.7 mm or less, from the standpoint that the enhancement effect of surface strength by an acid treatment described hereinafter is particularly appeared.

The composition of the glass for chemical strengthening of the present invention is not particularly limited. Examples thereof include following glass compositions.

(i) A glass containing, in a composition indicated by mol %, 50 to 80% of $SiO_2$, 2 to 25% of $Al_2O_3$, 0 to 10% of $Li_2O$, 0 to 18% of $Na_2O$, 0 to 10% of $K_2O$, 0 to 15% of MgO, 0 to 5% of CaO, and 0 to 5% of $ZrO_2$.

(ii) A glass containing, in a composition indicated by mol %, 50 to 74% of $SiO_2$, 1 to 10% of $Al_2O_3$, 6 to 14% of $Na_2O$, 3 to 11% of $K_2O$, 2 to 15% of MgO, 0 to 6% of CaO, and 0 to 5% of $ZrO_2$, in which the sum of the contents of $SiO_2$ and $Al_2O_3$ is 75% or less, the sum of the contents of $Na_2O$ and $K_2O$ is 12 to 25%, and the sum of the contents of MgO and CaO is 7 to 15%.

(iii) A glass containing, in a composition indicated by mol %, 68 to 80% of $SiO_2$, 4 to 10% of $Al_2O_3$, 5 to 15% of $Na_2O$, 0 to 1% of $K_2O$, 4 to 15% of MgO, and 0 to 1% of $ZrO_2$.

(iv) A glass containing, in a composition indicated by mol %, 67 to 75% of $SiO_2$, 0 to 4% of $Al_2O_3$, 7 to 15% of $Na_2O$, 1 to 9% of $K_2O$, 6 to 14% of MgO, and 0 to 1.5% of $ZrO_2$, in which the sum of the contents of $SiO_2$ and $Al_2O_3$ is 71 to 75%, the sum of the contents of $Na_2O$ and $K_2O$ is 12 to 20%, and the content of CaO when contained is less than 1%.

(Etching Treatment of Edge Surface)

In the production method of the present invention, the edge surface of a glass is subjected to an etching treatment before the after-mentioned ion-exchanging step to be conducted for forming a compressive stress layer on the glass surface. Thereby bending strength of a glass can be enhanced.

Generally, in the case where the edge surface of a glass sheet has defective part such as scratches, when stress concentrates in the defective part of the edge surface, the problem occurs that cracks are generated in the glass sheet. In other words, strength of the glass sheet is deteriorated. Therefore, to prevent the deterioration of strength of the glass sheet, it is important to sufficiently round the tip of the defective part such as scratches present on the edge surface.

(a) of FIG. 2 and (b) of FIG. 2 are explanatory views illustrating the state of etching of an edge surface of a glass sheet 10. A defective part 30 such as a scratch is present on an edge surface 2a (2b) of the glass sheet 10. When the edge surface 2a (2b) of the glass sheet 10 is brought into contact with a treating liquid, the treating liquid enters the defective part 30, and as a result, an etch pit 20 is formed. The etch pit 20 is a dimple formed when etching is performed with the treating liquid. Etching using a treating liquid is generally isotropic etching. The edge surface 2a (2b) is etched to a depth of about a half of a maximum cross-sectional size D of the etch pit 20, and the tip of the defective part such as scratch reaching a deep part of the edge surface 2a (2b) is rounded. Therefore, in the case of having defective part such as scratch on the edge surface, the chemically strengthened glass of the present invention preferably has a concaved part formed by the etching treatment on the edge surface. In other words, it is preferred that the chemically strengthened glass of the present invention has a concave part having a round tip on the edge surface.

A mother sheet for a glass sheet is prepared ((a) of FIG. 3), and as necessary, chamfering is conducted to a glass edge surface ((b) of FIG. 3). The glass edge surface means faces 2a and 2b connecting one glass main surface (front surface) 1a to the other glass main surface (back surface) 1b, as illustrated in (a) of FIG. 3. The glass edge surface includes chamfered faces 2c and 2d when chamfering of an edge surface had been conducted, as illustrated in (b) of FIG. 3.

The chamfering method includes a method of using a rotating grindstone 500 as illustrated in FIG. 4. A ring-shaped grinding groove 520 extending in a circumferential direction is formed on an outer peripheral surface 510 of the rotating grindstone 500. The rotating grindstone 500 relatively moves along an outer edge of a mother sheet glass 100A while being made to rotate centering a center line of the rotating grindstone 500, and grinds an outer edge part of the mother sheet glass 100A by a wall face of the grinding groove 520. The wall face of the grinding groove 520 contains grinding abrasives such as alumina, silicon carbide or diamond. A cooling liquid such as water may be used when grinding.

From the standpoint of appearance, it is preferred that the part to be etched is only a glass edge surface, and it is preferred that main surfaces (front surface and back surface) of a glass are not etched. Therefore, for example, to prevent the main surfaces of a glass from being etched, a protective film P is adhered to both main surfaces of a glass as illustrated in (c) of FIG. 3, and the main surfaces of the glass are prevented to be in contact with a treating liquid. It is preferred that the protective film is protruded from an edge surface of the glass, and it is preferred that the protrusion amount P1 is about 0.4 to 1.0 mm. When the protrusion amount is 0.4 mm or more, the edge surface chamfered is prevented from being ununiformly etched, and strength of a glass can be enhanced. When the protrusion amount of the protective film is 1.0 mm or less, the edge surface is easy to be brought into contact with the treating liquid, and productivity can be improved.

The etching method includes a method of bringing the edge surface of a glass into contact with the treating liquid. The treating liquid is preferred to contain hydrogen fluoride (HF), and it is more preferred to further contain strong acid such as hydrochloric acid or sulfuric acid, in addition of hydrogen fluoride. In the case of an etching liquid containing hydrogen fluoride and hydrochloric acid, concentrations of each can be, for example, about 7 wt %. It is preferred that the temperature of the treating liquid is controlled to a range of, for example, 20° C. to 40° C. It is preferred that the contact time to the treating liquid is a range of 1 to 30 minutes from the standpoint of productivity.

In bringing the edge surface of a glass into contact with the treating liquid, it is preferred to apply ultrasonic waves as necessary. The tip of etch pit can be further securely rounded by energy of ultrasonic waves, and strength of a glass can be further enhanced. It is preferred that the frequency of ultrasonic waves is 26 kHz to 950 kHz.

One example of an etching apparatus is illustrated in FIG. 5. As illustrated in FIG. 5, an etching apparatus 700 includes an inner tank 712 storing a treating liquid 710 therein, an outer tank 716 surrounding the inner tank 712 and storing water 714 therein, and an ultrasonic wave vibrator 718 placed on the bottom of the outer tank 716. Even in the case where the outer tank 716 does not have resistance to a treating liquid 710, by adopting a two-tank structure of the inner tank 712 and the outer tank 716, resistance to the treating liquid 710 can be imparted to the inner tank 712, and as a result, it can be used as the etching apparatus 700. On the other hand, if the outer tank 716 can have resistance to the treating liquid 710, the treating liquid 710 can be stored in the outer tank 716 and as a result, the inner tank 712 can be omitted and a one-tank structure can be adopted.

A plurality of mother sheet glasses 100A having a protective film P adhered to both surfaces thereof is held in a vertical direction inside a cassette 800, which is a holder. The cassette 800 is constituted of a combination of a plurality of support columns and a plurality of beams in a rectangular parallelepiped shape. The cassette 800 has a constitution having a plurality of openings in each direction such that the treating liquid 710 is easy to flow in and flow out. The combination of the number, intervals and the like of support columns and beams may be freely set depending on the size, the number and the like of the mother sheet glasses 100A to be stored, and the shape of the cassette 800 is not limited to a rectangular parallelepiped shape. A handle is provided in the cassette 800 in order to make easily movable. In the present embodiment, ultrasonic waves generated from an ultrasonic vibrator 718 are propagated to the treating liquid 710 through water 714 in the outer tank 716 and the inner tank 712.

Etching is conducted until etching removal amount of the edge surfaces 2a and 2b reaches a predetermined range.

In the production method of the present invention, after the etching treatment, each treatment of chemical strengthening by ion exchange, cleaning, acid treatment, and alkali treatment is conducted. It is rare that skewness (Rsk) of an edge surface is influenced by those steps. Therefore, skewness (Rsk) of an edge surface after the etching treatment is substantially equal to skewness (Rsk) of an edge surface of the chemically strengthened glass of the present invention obtained by passing through all steps.

(Chemical Strengthening)

After the etching treatment of an edge surface, the glass is subjected to chemical strengthening by ion exchange.

The chemically strengthened glass of the present invention has an ion-exchanged compressive stress layer on the glass surface. In the ion-exchange method, the surface of the glass is ion-exchanged to form a surface layer having residual compressive stress. Specifically, alkali metal ions (typically, Li ion and Na ion) having small ionic radius on the surface of a glass sheet are substituted with alkali ions (typically, Na ion or K ion in the case of Li ion, and K ion in the case of Na ion) having larger ionic radius by ion exchange at a temperature equal to or lower than a glass transition point. Thereby, compressive stress remains on the surface of a glass, and strength of a glass is enhanced.

In the production method of the present invention, chemical strengthening is conducted by bringing a glass into contact with an inorganic salt containing potassium nitrate ($KNO_3$). Na ions on the surface of a glass are ion-exchanged with K ions in the inorganic salt by this, and a compressive stress layer having high density is thus formed. As the method for bringing a glass into contact with an inorganic salt, a method of applying a paste-like inorganic salt, a method of jetting an inorganic salt aqueous solution to a glass, a method of dipping a glass in a salt bath of a molten salt heated to equal to or higher than the melting point thereof, and the like are possible. Of those, a method of dipping in a molten salt is desirable.

The inorganic salt is preferably one having the melting point equal to or lower than the strain point (generally 500 to 600° C.) of a glass to be chemically strengthened, and in the present invention, an inorganic salt containing potassium nitrate (melting point: 330° C.) is preferred. When potassium nitrate is contained, it is in a molten state at equal to or lower than the strain point of a glass and handling becomes easy in a used temperature region, which is therefore preferable. It is preferred that the content of potassium nitrate in the inorganic salt is 50 mass % or more.

It is preferred that the inorganic salt further contains at least one kind of salt selected from the group consisting of $K_2CO_3$, $Na_2CO_3$, $KHCO_3$, $NaHCO_3$, $K_3PO_4$, $Na_3PO_4$, $K_2SO_4$, $Na_2SO_4$, KOH, and NaOH. Above all, it is more preferred to contain at least one kind of salt selected from the group consisting of $K_2CO_3$, $Na_2CO_3$, $KHCO_3$, and $NaHCO_3$.

The salt (hereinafter sometimes referred to as a "flux") has a property of cutting network of a glass, represented by Si—O—Si bond. The temperature at which chemical strengthening is conducted is high as several hundreds ° C. Therefore, a covalent bond between Si—O of a glass is appropriately cut at the temperature, and a density-decreasing treatment described hereinafter is easy to proceed.

The degree of cutting a covalent bond varies depending on a composition of a glass, a kind of a salt (flux) used, and chemical strengthening treatment conditions such as a temperature, time and the like for which a glass is brought into contact with an inorganic salt. It is considered to be preferable to select the condition of an extent such that 1 to 2 bonds of 4 covalent bonds extending from Si are cut.

For example, in the case of using $K_2CO_3$ as a flux, when the content of the flux in the inorganic salt is 0.1 mol % or more and the chemical strengthening treatment temperature is 350 to 500° C., the chemical strengthening treatment time is preferably 1 minute to 10 hours, more preferably 5 minutes to 8 hours, and still more preferably 10 minutes to 4 hours.

From the standpoint of control of a surface hydrogen concentration, the addition amount of a flux is preferably 0.1 mol % or more, more preferably 0.5 mol % or more, still more preferably 1 mol % or more, and particularly preferably 2 mol % or more. Furthermore, from the standpoint of productivity, it is preferably an amount of equal to or less than the solubility of each salt. Excessive addition thereof may lead to corrosion of a glass. For example, in the case of using $K_2CO_3$ as the flux, it is preferably 24 mol % or less, more preferably 12 mol % or less, and particularly preferably 8 mol % or less.

The inorganic salt may further contain other chemical species in a range that does not impair the effect of the present invention, in addition to potassium nitrate and the flux, and examples thereof include alkali hydrochlorides and alkali borates such as sodium chloride, potassium chloride, sodium borate, and potassium borate. Those may be added alone or may be added as mixtures of plural species thereof.

The production method of the present invention is described below by reference to an embodiment in which chemical strengthening is performed by a method of dipping a glass in a molten salt.

(Production 1 of Molten Salt)

Molten salt can be produced by the following steps.

Step 1a: Preparation of potassium nitrate molten salt

Step 2a: Addition of flux to potassium nitrate molten salt (Step 1a—Preparation of Potassium Nitrate Molten Salt—)

In the step 1a, potassium nitrate is charged in a vessel, followed by heating to a temperature equal to or higher than the melting point and melting, whereby preparing a molten salt. The melting is conducted at a temperature in a range between the melting point (330° C.) of potassium nitrate and the boiling point (500° C.) thereof. Particularly, setting the melting temperature to 350 to 470° C. is more preferred from the standpoints of the balance between surface compressive stress (CS) that can be applied to a glass and a depth of a compressive stress layer (DOL), and strengthening time.

For the vessel for melting potassium nitrate, a metal, quartz, ceramics, or the like can be used. Above all, a metal material is desirable from the standpoint of durability, and a stainless steel (SUS) material is preferable from the standpoint of corrosion resistance.

(Step 2a—Addition of Flux to Potassium Nitrate Molten Salt—)

In the step 2a, the flux described before is added to the potassium nitrate molten salt prepared in the step 1a, followed by mixing, so that the entire becomes uniform, by a stirring blade or the like while maintaining the temperature within a certain range. In the case of using a plurality of fluxes in combination, the order of addition thereof is not limited, and those may be simultaneously added.

The temperature is preferably equal to or higher than the melting point of potassium nitrate, specifically 330° C. or higher, and more preferably 350 to 500° C. The stirring time is preferably 1 minute to 10 hours, and more preferably 10 minutes to 2 hours.

(Production 2 of Molten Salt)

The method of adding a flux after the preparation of the molten salt of potassium nitrate is exemplified in the production 1 of a molten salt. The molten salt can also be produced by the following steps.

Step 1b: Mixing of potassium nitrate and flux

Step 2b: Melting of mixed salt of potassium nitrate and flux (Step 1b—Mixing of potassium nitrate and flux-)

In the step 1b, potassium nitrate and the flux are charged in a vessel, and mixed by a stirring blade or the like. In the case of using a plurality of fluxes, the order of addition thereof is not limited, and those may be simultaneously added. As the vessel, the same one as used in the step 1a above can be used.

(Step 2b—Melting of Mixed Salt of Potassium Nitrate and Flux—)

In the step 2b, the mixed salt obtained in the step 1b is heated and melted. The melting is conducted at a temperature within a range between the melting point (330° C.) of potassium nitrate and the boiling point (500° C.) thereof. Particularly, setting the melting temperature to 350 to 470° C. is more preferred from the standpoints of the balance between surface compressive stress (CS) that can be applied to a glass and a depth of a compressive stress layer (DOL), and strengthening time. The stirring time is preferably 1 minute to 10 hours, and more preferably 10 minutes to 2 hours.

In the molten salt obtained by passing through the step 1a and the step 2a, or the step 1b and the step 2b, in the case where precipitates are formed by the addition of the flux, prior to conducting the chemical strengthening treatment of a glass, the molten salt is allowed to stand until the precipitates settle on the bottom of the vessel. The precipitates contain the flux that exceeds a saturated solubility and a salt in which cations of the flux have been exchanged in the molten salt.

The molten salt used in the production method of the present invention has Na concentration of preferably 500 weight ppm or more, and more preferably 1000 weight ppm or more. When the Na concentration in the molten salt is 500 weight ppm or more, a low density layer is easy to deepen by an acid treatment step described hereinafter, which is therefore preferable. The upper limit of the Na concentration is not particularly limited, and can be allowable until desired surface compressive stress (CS) is obtained.

The molten salt having been subjected to the chemical strengthening one time or more contains sodium eluted from a glass. Therefore, when the Na concentration is already within the above range, sodium derived from a glass may be directly used as Na source. In the case where the Na concentration is not sufficient or in the case of using a molten salt that is not used in chemical strengthening, it can be adjusted by adding an inorganic sodium salt such as sodium nitrate.

Thus, the molten salt can be prepared by the step 1a and the step 2a, or the step 1b and the step 2b.

(Ion Exchange)

Chemical strengthening treatment is then conducted by using the molten salt prepared. The chemical strengthening treatment is conducted by dipping a glass in a molten salt and substituting metal ions (Na ions) in the glass with metal ions (K ions) having large ionic radius in the molten salt. The ion exchange can change a composition of the glass surface and can form a compressive stress layer 50 in which a density of the glass surface has been increased [(d) of FIG. 3 to (e) of FIG. 3]. Compressive stress is generated by the densification of the glass surface, and the glass can be strengthened.

Actually, the density of the chemical strengthened glass is gradually increased toward the surface of the compressive stress layer from an outer edge of an intermediate layer 60 (bulk) present in the center of the glass. Therefore, clear boundary at which a density rapidly changes is not present between the intermediate layer 60 and the compressive stress layer 50. The intermediate layer used herein represents a layer present in the central portion of the glass and sandwiched between the compressive stress layers. The intermediate layer is a layer that is not ion-exchanged, differing from the compressive stress layer.

The chemical strengthening treatment in the present invention can be specifically conducted by the following step 3.

Step 3: Chemical strengthening treatment of glass (Step 3—Chemical Strengthening Treatment of Glass—)

In the step 3, a glass is preheated, and the molten salt prepared in the step 1a and step 2a, or the step 1b and step 2b is adjusted to a temperature for conducting chemical strengthening. The preheated glass is then dipped in the molten salt for a given period of time, and the glass is taken out of the molten salt and cooled by allowing to stand. It is preferred that before the chemical strengthening treatment, the glass is subjected to shape processing according to uses, for example, mechanical processing such as cutting, edge surface processing or drilling.

The preheating temperature of the glass depends on the temperature when dipping in the molten salt, but generally is preferably 100° C. or higher.

The chemical strengthening temperature is preferably equal to or lower than a strain point (generally 500 to 600° C.) of a glass to be strengthened, and is particularly preferably 350° C. or higher in order to obtain larger depth of the compressive stress layer.

The dipping time in the molten slat of the glass is preferably 1 minute to 10 hours, more preferably 5 minutes to 8 hours, and still more preferably 10 minutes to 4 hours. Within the range, a chemically strengthened glass having excellent balance between strength and the depth of a compressive stress layer can be obtained.

In the production method of the present invention, the following steps are subsequently conducted after the chemical strengthening treatment.

Step 4: Cleaning of glass

Step 5: Acid treatment of glass after passing through step 4

At the time when the step 5 has been passed, the glass surface further has a low density layer 40 in which a surface layer of the compressive stress layer has been denatured, specifically density-decreased [(f) of FIG. 3]. The low density layer is formed by that Na and K are eliminated (leached) from the outermost surface of the compressive stress layer and H enters (substituting) instead of those.

The step 4 and step 5 are described in detail below.

(Step 4—Cleaning of Glass—)

In the step 4, cleaning of a glass is conducted by using industrial water, ion-exchanged water or the like. Above all, ion-exchanged water is preferred. The conditions of cleaning vary depending on a cleaning liquid used. In the case of using ion-exchanged water, cleaning at a temperature of 0 to 100° C. is preferred from the standpoint that salt deposited is completely removed.

(Step 5—Acid Treatment—)

In the step 5, the glass cleaned in the step 4 is further subjected to an acid treatment.

The acid treatment of a glass is conducted by dipping the chemically strengthened glass in an acidic solution, and thereby Na and/or K on the surface of the chemically strengthened glass can be substituted with H.

The solution is not particularly limited so long as it is acidic, and so long as it has pH of less than 7. The acid used may be weak acid and may be strong acid. Specifically, acids such as hydrochloric acid, nitric acid, sulfuric acid, phosphoric acid, acetic acid, oxalic acid, carbonic acid, and citric acid are preferably used. Those acids may be used alone or may be used as combination of plurality of those.

The temperature for conducting the acid treatment varies depending on the kind and concentration of an acid used and time, but it is preferred to conduct it at 100° C. or lower.

The time for conducting the acid treatment varies depending on the kind and concentration of an acid used and a temperature, but it is preferably 10 seconds to 5 hours from the standpoint of productivity, and is more preferably 1 minute to 2 hours.

The concentration of the solution for conducting the acid treatment varies depending on the kind of an acid used, time and a temperature, but the concentration with less concern of corrosion of a vessel is preferred. Specifically, 0.05 wt % to 20 wt % is preferred.

The low density layer is removed by an alkali treatment described hereinafter, and the glass surface is easy to be removed as the thickness of the low density layer is increased. Therefore, the thickness of the low density layer is preferably 5 nm or more, and more preferably 20 nm or more, from the standpoint of a removal amount of the glass surface. The thickness of the low density layer can be controlled by a concentration of a flux, a sodium concentration, temperature, time, and the like in the chemically strengthening step.

It is preferred that the density of the low density layer is lower than the density of a region (bulk) deeper than the compressive stress layer ion-exchanged, from the standpoint of removability of the glass surface.

The thickness of the low density layer can be obtained from a period ($\Delta\theta$) measured by X-ray-Reflectometry (XRR).

The density of the low density layer can be obtained by a critical angle ($\theta c$) measured by XRR.

Simply, it is also possible to confirm the formation of the low density layer and the thickness of the layer by observing a cross-section of a glass with a scanning electron microscope (SEM).

In the production method of the present invention, the following step is subsequently conducted after the acid treatment.

Step 6: Alkali treatment

A part or the whole of the low density layer 40 formed until the step 5 can be removed by the step 6 [(f) of FIG. 3 and (g) of FIG. 3].

The step 6 is described in detail below.

(Step 6—Alkali Treatment—)

In the step 6, the glass acid-treated in the step 5 is further subjected to an alkali treatment.

The alkali treatment is conducted by dipping the chemically strengthened glass in a basic solution, and a part or the whole of the low density layer can be removed by this.

The solution is not particularly limited so long as it is basic, and so long as it has pH of more than 7. Weak base may be used, and strong base may be used. Specifically, bases such as sodium hydroxide, potassium hydroxide, potassium carbonate, and sodium carbonate are preferred. Those bases may be used alone or may be used as combination of plurality of those.

The temperature for conducting the alkali treatment varies depending on the kind and concentration of a base used and time, but it is preferably 0 to 100° C., more preferably 10 to 80° C., and particularly preferably 20 to 60° C. Within the temperature range, there is no possibility of corrosion of a glass, which is therefore preferable.

The time for conducting the alkali treatment varies depending on the kind and concentration of a base used and a temperature, but 10 seconds to 5 hours is preferred from the standpoint of productivity, and 1 minute to 2 hours is more preferred.

The concentration of the solution for conducting the alkali treatment varies depending on the kind of a base used, time and temperature, but it is preferably 1 wt % to 20 wt % from the standpoint of removability of the glass surface.

By the alkali treatment, a part or the whole of the low density layer in which H has entered is removed, and the surface layer in which a hydrogen concentration profile satisfies the specific relational equation (I) described before is exposed. The chemically strengthened glass having enhanced surface strength can be obtained by this. Furthermore, scratches having been present on the glass surface are simultaneously removed by removing the low density layer, and it is considered that this also contributes to enhancement of strength.

According to the production method of the present invention, safety of a liquid medicine handled is high, so that special equipment is not necessary. Therefore, the chemically strengthened glass having markedly enhanced surface strength and bending strength can be safely and efficiently obtained.

The amount of the low density layer to be removed depends on conditions of the alkali treatment. (g) of FIG. 3 illustrates the embodiment that the whole of the low density layer 40 has been removed and the compressive stress layer 50 is exposed on the outermost surface. However, a part of the low density layer 40 may be removed and a part thereof may remain. From the standpoint of enhancement of strength, the effect can be obtained even though the whole of the low density layer is not removed, but it is preferred to remove the whole of the low density layer from the standpoint of stably securing transmittance of a glass.

EXAMPLES

The present invention is specifically described below by reference to Examples, but the present invention is not limited thereto.

<Evaluation Method>

Various evaluations in the Examples were conducted by the following analytical methods.

(Evaluation of Glass: Surface Stress)

Compressive stress value of a compressive stress layer and a depth of a compressive stress layer in the chemically strengthened glass of the present invention can be measured by using EPMA (electron probe micro analyzer), a surface stress meter (for example, FSM-6000, manufactured by Orihara Industrial Co., Ltd.) or the like. In the Examples, a surface compressive stress value (CS, unit: MPa) and a depth of a compressive stress layer (DOL, unit: μm) were measured by using a surface stress meter (FSM-6000), manufactured by Orihara Industrial Co., Ltd.

(Evaluation of Glass: Removal Amount)

Removal amount thickness of a glass was obtained by measuring a weight before and after a treatment with a liquid medicine by an electronic analytical balance (HR-202i; manufactured by A&D Company, Limited), followed by converting into a thickness by using the following equation.

(Removal amount thickness per one side)=[(Weight before treatment)−(Weight after treatment)]/ (Specific gravity of glass)/Treated area/2

In this case, the calculation was conducted with the specific gravity of the glass being 2.48 (g/cm$^3$).

(Evaluation of Glass: Surface Strength)

The surface strength of a glass was measured by ball on ring (BOR) test. A schematic view for explaining the ball on ring test used in the present invention is illustrated in FIG. 1. In the state that the glass sheet 1 was placed horizontally, glass sheet 1 was pressurized by using a pressuring jig 2 made of SUS304 (hardened steel, diameter 10 mm, mirror finishing) and surface strength of the glass sheet 1 was measured.

In FIG. 1, the glass sheet 1 as a sample is horizontally provided on a receiving jig 3 made of SUS304 (diameter: 30 mm, curvature R of contact part: 2.5 mm, contact part is hardened steel, mirror finishing). The pressuring jig 2 for pressuring the glass sheet 1 is provided above the glass sheet 1.

In the present embodiment, a central region of the glass sheet 1 was pressurized from the above of the glass sheet 1 obtained after the Examples and Comparative Examples. The test conditions are as follows.

Thickness of sample: 0.56 (mm)
Lowering speed of pressurizing jig 2: 1.0 (mm/min)

In this case, fracture load (unit: N) when the glass was fractured was used as BOR surface strength, and an average value of 20-times measurement was used as BOR average surface strength. However, in the case where a fracture origin of a glass sheet was 2 mm or more apart from a ball pushing position, the case was eliminated from data for calculating the average value.

(Evaluation of Glass: Hydrogen Concentration)

Hydrogen concentration profile was measured according to the method described in the item of [Measurement method of hydrogen concentration profile] described before, and the relational equation (I) was derived.

(Evaluation of Glass: Bending Strength)

Four-point bending strength was measured according to the test method defined in JIS R1601 (2008). The measurement was conducted 20 times, and an average value was calculated.

(Evaluation of Glass: Surface Roughness of Main Surface of Glass)

Surface roughness of a main surface of the glass was measured by AFM measurement. AFM measurement condition: Atomic Force Microscope (XE-HDM; Park systems), scan size: 10×5 μm, color scale: ±1 nm, scan speed: 1 Hz (Evaluation of Glass: Skewness (Rsk) of Glass Edge Surface)

Skewness (Rsk) of the glass edge surface was measured based on JIS B0601 (2001).

As the apparatus, non-contact surface shape measuring instrument PF-60, manufactured by Mitaka Kohki Co., Ltd., was used. A measurement sample was set to a predetermined position, and the edge surface of 50 to 100 μm from the boundary part between the glass main surface and the edge surface was measured. Measurement scan speed was index mode, and measurement conditions and calculation were performed according to JIS B0601 (2001).

Example 1

100 aluminosilicate glass sheets A obtained by cutting aluminosilicate glass into a size of 50 mm×50 mm×0.56 mm by a cutter wheel were prepared. Edge surfaces of those were chamfered into C surface shape by a rotating grindstone having fixed thereto abrasives having particle number of #600.

Composition of aluminosilicate glass A (mol % indication): $SiO_2$ 64.4%, $Al_2O_3$ 8.0%, $Na_2O$ 12.5%, $K_2O$ 4.0%, MgO 10.5%, CaO 0.1%, SrO 0.1%, BaO 0.1%, $ZrO_2$ 0.5%

(Etching Treatment Step of Edge Surface)

A protective film (N380, manufactured by Nitto Denko Corporation) was adhered such that main surfaces of a glass were not etched. The film adhesion was performed under a load of 2.8 to 3.2 kg by using rollers, and protruding quantity from an edge surface was about 0.5 mm. Etching treatment of was conducted by using an etching liquid of 7 wt % HF/7 wt % HCl. The time was such that removal stock of an edge surface (one side) was a predetermined amount, and application of ultrasonic waves and swing were not conducted. The etching temperature was 20° C. to 25° C. Etching was performed for a prescribed time, cleaning with pure water was performed, the film was then peeled, and cleaning with pure water was further performed.

(Chemically Strengthening Step)

5100 g of potassium nitrate, 270 g of potassium carbonate and 210 g of sodium nitrate were added to SUS cup, and heated to 450° C. by a mantle heater to prepare a molten salt containing 6 mol % of potassium carbonate and 10000 weight ppm of sodium. The aluminosilicate glass A after the edge surface etching treatment was preheated to 200 to 400° C., and then dipped in the molten salt at 450° C. for 2 hours to perform an ion exchange treatment, followed by cooling to approximate room temperature, thereby performing a chemical strengthening treatment. The chemically strengthened glass obtained was cleaned with pure water and subjected to a next step.

(Acid Treatment Step)

13.4 wt % hydrochloric acid (HCl; manufactured by Kanto Chemical Co., Ltd.)

was prepared in a beaker, and the temperature was adjusted to 40° C. by using a water bath. The glass obtained in the chemically strengthening step was dipped in the hydrochloric acid prepared for 120 seconds to perform an acid treatment, cleaned with pure water several times, and then dried by air blowing. The glass thus obtained was subjected to a next step.

(Alkali Treatment Step)

4.0 wt % sodium hydroxide aqueous solution was prepared in a beaker, and the temperature was adjusted to 40° C. by using a water bath. The glass obtained in the acid treatment step was dipped in the sodium hydroxide aqueous solution prepared for 120 seconds to perform an alkali treatment, cleaned with pure water several times, and then dried by air blowing.

Thus, the chemically strengthened glass of Example 1 was obtained.

Examples 2 and 3

Chemically strengthened glasses were produced in the same manner as in Example 1, except that in the etching treatment of the edge surface, etching was conducted such that etching removal stock was the amount shown in Table 1.

Example 4

Chemically strengthened glass was produced in the same manner as in Example 1, except that the number of rotating grindstone was #325, and in the etching treatment of the edge surface, etching was conducted such that etching removal stock was the amount shown in Table 1.

Examples 5 and 6

Chemically strengthened glasses were produced in the same manner as in Example 1, except that the number of rotating grindstone was #1200, and in the etching treatment of the edge surface, etching was conducted such that etching removal stock was the amount shown in Table 1.

Comparative Example 1

Chemically strengthened glass was produced in the same manner as in Example 1, except that the etching treatment of an edge surface was not conducted.

Comparative Examples 2 to 4

Chemically strengthened glasses were produced in the same manner as in Examples 1 to 3, respectively, except that potassium carbonate was not added to the molten salt in the chemically strengthening step, and the acid treatment step and alkali treatment step were not carried out.

Comparative Example 5

Chemically strengthened glass was produced in the same manner as in Example 1, except that the etching treatment of an edge surface was not conducted, potassium carbonate was not added to the molten salt in the chemically strengthening step, and the acid treatment step and alkali treatment step were not carried out.

Various evaluations were conducted as for the chemically strengthened glasses thus obtained. The results are shown in Table 1.

Graphs in which a hydrogen concentration profile of a surface layer of each chemically strengthened glass obtained in Example 1 and Comparative Example 2 was plotted are shown in FIG. 6 and FIG. 7. Although not shown, Examples 2 to 6 and Comparative Example 1 showed similar hydrogen concentration profile to that in Example 1, and Comparative Examples 3 to 5 showed similar hydrogen concentration profile to that in Comparative Example 2.

DESCRIPTION OF REFERENCE NUMERALS AND SIGNS

1a Glass main surface (front surface)
1b Glass main surface (back surface)
2a Edge surface
2b Edge surface
P Protective film
40 Low density layer
50 Compressive stress layer
60 Intermediate layer

The invention claimed is:

1. A chemically strengthened glass having a compressive stress layer formed on a surface layer thereof by an ion exchange method, wherein:

TABLE 1

| | | | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 |
|---|---|---|---|---|---|---|---|---|---|---|---|---|---|
| | Kind of glass | | | | | Aluminosilicate glass A | | | | | Alumino silicate glass A | | |
| Edge surface processing | Chamfering | | #600 | #600 | #600 | #325 | #1200 | #1200 | #600 | #600 | #600 | #600 | #600 |
| | Etching removal amount | | 40 μm | 28 μm | 15 μm | 40 μm | 25 μm | 15 μm | 0 μm | 40 μm | 28 μm | 15 μm | 0 μm |
| Chemical strengthening | $K_2CO_3$ | mol % | | | | 6 | | | | | | | |
| | Na amount | wt ppm | | | | 10000 | | | | | | | |
| | Temperature | ° C. | | | | 450 | | | | | | 450 | |
| | Time | min | | | | 120 | | | | | | 120 | |
| Acid treatment | Liquid medicine | Kind | | | | HCl | | | | | | — | |
| | Concentration | wt % | | | | 13.4 | | | | | | — | |
| | Temperature | ° C. | | | | 40 | | | | | | — | |
| | Time | sec | | | | 120 | | | | | | — | |
| Alkali treatment | Liquid medicine | Kind | | | | NaOH | | | | | | — | |
| | Concentration | wt % | | | | 4 | | | | | | — | |
| | Temperature | ° C. | | | | 40 | | | | | | — | |
| | Time | sec | | | | 120 | | | | | | — | |
| Sheet thickness t | | mm | | | | 0.56 | | | | | | 0.56 | |
| Surface strength | | N | | | | 800 | | | | | | 450 | |
| | F > 2000 $t^2$ | | | | | Satisfied | | | | | | Not satisfied | |
| | F > 1500 $t^2$ | | | | | Satisfied | | | | | | Not satisfied | |
| Bending strength | | MPa | 1245 | 1101 | 781 | 1258 | 1153 | 1000 | 696 | 837 | 824 | 717 | 639 |
| Surface removal amount | | nm | | | | 154 | | | | | | — | |
| Formula (I) | a | | | | | −0.159 | | | | | | −0.295 | |
| | b | | | | | 0.138 | | | | | | 0.311 | |
| CS | | MPa | | | | 670.0 | | | | | | 715.0 | |
| DOL | | μm | | | | 39.0 | | | | | | 42.0 | |
| Edge surface skewness (Rsk) | | — | 0.10 | −0.39 | −0.22 | −0.23 | −0.46 | −0.47 | −1.49 | 0.10 | −0.39 | −0.22 | −1.49 |

From the results of Table 1, in the chemically strengthened glasses of the Examples that satisfy the relational equation (I) and have skewness of an edge surface being specific value or more, both surface strength and bending strength were greatly enhanced as compared with those of the comparative examples.

While the present invention has been described in detail and with reference to specific embodiments thereof, it will be apparent to one skilled in the art that various changes and modifications can be made therein without departing from the spirit and scope of the present invention. The present application is based on a Japanese patent application (Application No. 2015-008848) filed on Jan. 20, 2015, the content thereof being incorporated herein by reference.

INDUSTRIAL APPLICABILITY

According to the present invention, a chemically strengthened glass having greatly enhanced surface strength and bending strength can be obtained safely and at low cost. The chemically strengthened glass of the present invention can be used in a cover glass for displays such as a mobile phone, a digital camera and a touch panel display.

a straight line obtained by a linear approximation of a hydrogen concentration Y in a region of a depth X from an outermost surface of the glass satisfies the following relational equation (I) in X=0.1 to 0.4 (μm); and an edge surface connecting main surfaces on a front side and a back side of the glass has a skewness (Rsk) measured by using a non-contact profilometer based on JIS B0601 (2001) being −1.3 or more:

$$Y = aX + b \quad (I)$$

[in the equation (I), meanings of each symbol are as follows:

Y: hydrogen concentration (in terms of $H_2O$, mol/L);
X: depth from outermost surface of glass (μm);
a: −0.255 to −0.005; and
b: 0.020 to 0.215].

2. The chemically strengthened glass according to claim 1, wherein the edge surface connecting the main surfaces on the front side and the back side of the glass has a concave part formed by an etching treatment.

3. The chemically strengthened glass according to claim 1, wherein the glass is an aluminosilicate glass, a soda lime glass or an aluminoborosilicate glass.

* * * * *